United States Patent [19]

Bisson et al.

[11] Patent Number: 5,490,387

[45] Date of Patent: Feb. 13, 1996

[54] FLAME-OUT RESISTANT FUEL PUMPING SYSTEM

[75] Inventors: Bernard J. Bisson, Winsted; George L. Bennett, Hebron, both of Conn.

[73] Assignee: Coltec Industries Inc, New York, N.Y.

[21] Appl. No.: 249,115

[22] Filed: May 25, 1994

[51] Int. Cl.⁶ .................................................. F02C 7/22
[52] U.S. Cl. ................................... 60/734; 137/586
[58] Field of Search .................. 60/39.091, 39.094, 60/734, 39.33; 137/568; 244/135 R; 123/518; 417/313

[56] References Cited

U.S. PATENT DOCUMENTS

| | | | |
|---|---|---|---|
| 3,878,678 | 4/1975 | Huellmantel et al. | 60/39.281 |
| 4,612,766 | 9/1986 | Eder | 60/734 |
| 4,691,510 | 9/1987 | Taylor et al. | 60/734 |

FOREIGN PATENT DOCUMENTS

| | | | |
|---|---|---|---|
| 850997 | 7/1981 | U.S.S.R. | 60/734 |
| 1598555 | 9/1981 | United Kingdom | 60/734 |

Primary Examiner—Louis J. Casaregola
Attorney, Agent, or Firm—Howard S. Reiter

[57] ABSTRACT

The fuel pumping system for delivering fuel to an engine includes a fuel transfer circuit for directing fuel from a fuel supply tank to the engine, a fuel boost pump, a main fuel pump and an accumulator device positioned along the transfer circuit between the boost pump and the engine for accumulating fuel and vapor so as to provide a reserve supply of fuel to the engine while minimizing the amount of undissolved vapor delivered to the engine. The system includes a return passage communicating, at one end, with the accumulator and at an opposite end with the fuel transfer circuit upstream of the boost pump for directing fuel and vapor from the accumulator into the transfer circuit.

20 Claims, 1 Drawing Sheet

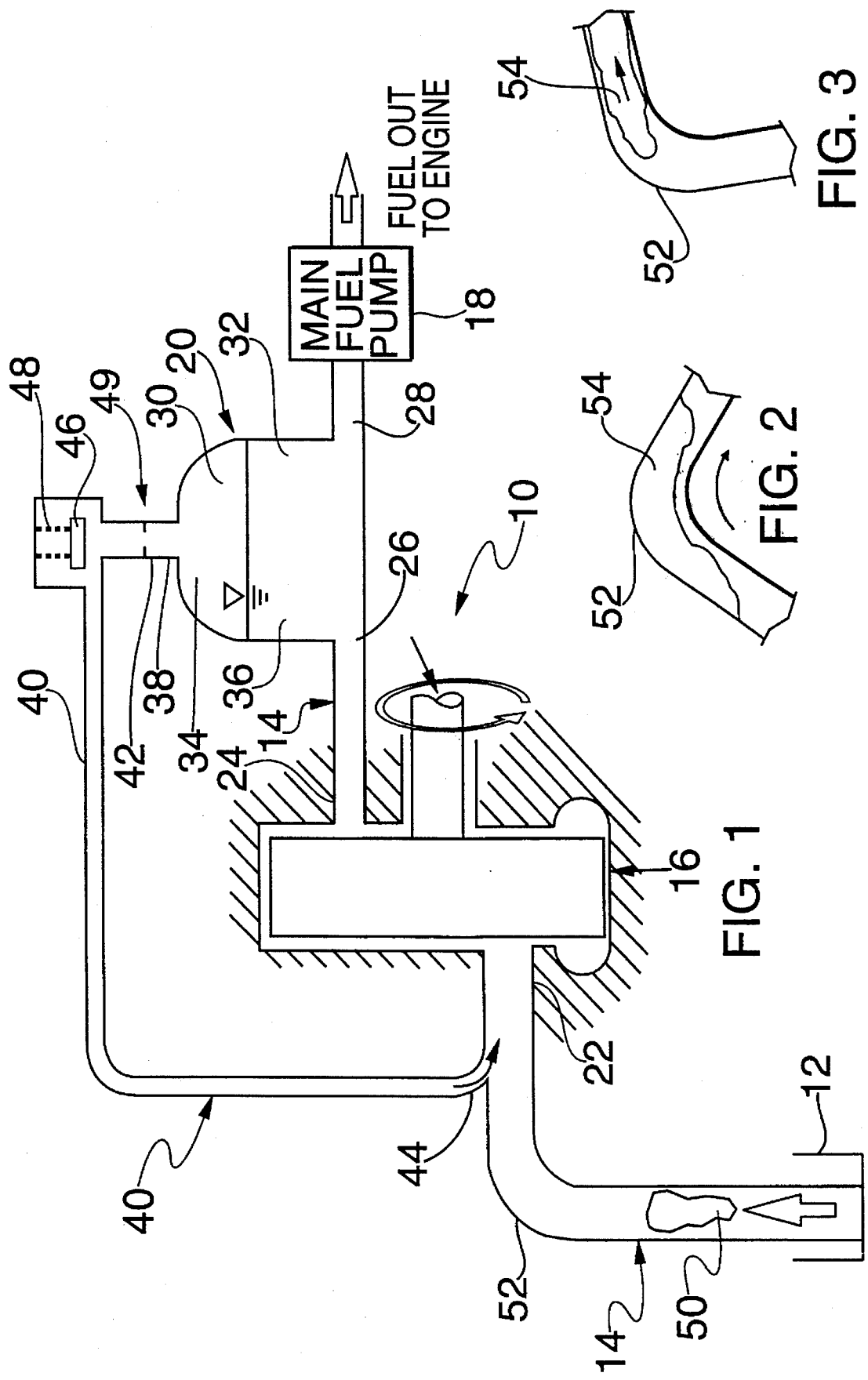

FLAME-OUT RESISTANT FUEL PUMPING SYSTEM

FIELD OF THE INVENTION

The present invention relates generally to fuel systems for aircraft, and more particularly, to an improved aircraft fuel system for substantially avoiding the disadvantageous effects of accumulated, undissolved vapor in the fuel conduits of the system.

BACKGROUND OF THE INVENTION

It is well known that quantities of vapor tend to remain undissolved in aircraft fuel while the fuel is stored, for example, in the fuel tank of an aircraft at ground level. It is also well known that such dissolved vapor may separate from the fuel, and become undissolved free vapor within the physical confines of the system, when the ambient pressure decreases for example as the altitude of the aircraft increases during flight. Other factors, such as ambient temperatures and the kinetic energy imparted to the fuel in the course of mechanical displacement within the aircraft fuel system, also tend to affect the separation of vapor from the liquid fuel.

The design and physical size requirements of commercial and military aircraft often result in the fuel tank or tanks being positioned relatively far away from the engine. For example, in combat helicopters, it is common for the fuel tank to be located perhaps six or seven feet below the engine, measured in the vertical direction, and perhaps an equal number of feet away from the engine in the horizontal direction. In this context, the terms "vertical" and "horizontal" refer generally to the customary gravitational and earth-bound horizon alignment axes, respectively. The fuel conduits, generally pipes and tubes, that carry fuel from the tank to the engine, necessarily include various vertical and horizontal portions to accommodate and conform to the structural frame of the aircraft. It has been found that substantial quantities of free vapor can accumulate easily and unintentionally in the portions of the fuel system conduits that include significant changes in direction, such as right angle bends and "ell" couplings.

At any point where the upper end of a vertical section of a fuel conduit forms a right angle connection with a horizontal section, the possibility exists that the right angle may assume a position where it becomes the vertex of an inverted "v", depending upon the flight "attitude" or position of the aircraft. When this occurs, free vapor that is mixed with fuel traveling through the fuel conduit tends to accumulate at this vertex. As a result, the less dense, lighter vapor tends to rise above the heavier fuel and becomes trapped within the confines of the downward sloping conduit sections on either side of the bend. If an aircraft continues in this position for a long enough period of time, which may be merely a matter of several seconds, depending upon the nature of the aircraft and the fuel system involved, the volume of vapor that accumulates in such an inverted "trap" may be substantial (e.g., a vapor "bubble" may fully occupy a continuous length of four feet or more of a fuel conduit). It must be understood that the vapor accumulated in this manner will not necessarily interrupt the flow of liquid fuel through the bend in the conduit since the fuel may continue to flow through the bend, albeit in a constricted manner, between the trapped vapor bubble and the lowest interior surface of the conduit.

However, in the event of a subsequent abrupt change of position, the accumulated vapor may be released suddenly into the fluid flow path as the horizontal portion of the conduit returns to its normal position or becomes tilted upwardly relative to the right angle bend. The fluid "bubble" thus released, representing a volume from which fluid fuel is entirely excluded, may have a length of several feet in ordinary fuel supply systems of known designs. The bubble will be carried through the fuel system conduit to the engine, assuming the bubble does not adversely affect the pumping ability of the pump so as to completely prevent the displacement of fuel through the system as discussed more fully hereinbelow. When the continuous supply of combustible liquid fuel is interrupted by the discharge of a vapor bubble, having a significantly lower level of combustibility, into the combustion chamber of an engine, the combustion process is undesirably and unintentionally affected; engine power may be significantly reduced, or the combustion process mail be at least temporarily terminated entirely, an occurrence commonly referred to as "flame-out". During flame-out, the engine is unable to provide adequate power to the aircraft, thereby adversely affecting the flight of the aircraft while placing the aircraft and personnel in extreme danger. In addition, restoration of normal engine operation often requires the pilot to rapidly complete a series of separate engine control tasks.

A disadvantage of many existing fuel supply systems for aircraft is the inability to quickly and effectively re-establish fuel flow to the engine once flame-out has occurred. All fuel supply systems require at least one fuel pump to deliver fuel from the fuel supply tanks to the engines. As a result of aircraft design requirements, once flame-out occurs, it is often necessary for the pump to draw or raise liquid vertically through a distance of several feet from the supply tank, through an at least partially empty conduit. This capability is known as "self-priming". Positive displacement pumps, such as gear pumps, are known to have this capability and are widely used in aircraft for delivering fuel directly to the engine. However, it is also well-known that positive displacement pumps require a certain minimum level of inlet pressure to assure that fuel does not vaporize as it enters the pump. Such vaporization can cause a substantial and adverse reduction in pump output and overall performance. One condition that is known to result in low inlet pressure is a relatively long vertical rise between the pump inlet and the supply tank from which the fuel is being pumped.

To overcome the undesirable low pressure at the inlet of a "main-stage" positive displacement type fuel pump, a "boost pump" may be provided in the main fuel path between the supply tank and the inlet of the main stage pump. The purpose of the boost pump is to raise the ambient pressure of the fuel in the supply line upstream of the main stage pump to a level that will satisfy the minimum inlet pressure required at the fuel inlet of the main stage pump. Centrifugal pumps or impeller pumps are known to be particularly well suited to supplying acceptable quantities of liquid at relatively constant pressure independently of the inlet fluid pressure. Accordingly, centrifugal pumps are commonly employed in aircraft fuel systems as boost pumps to provide a steady supply of liquid fuel at relatively constant pressure to the inlet of a positive displacement main stage pump.

However, centrifugal pumps are also subject to certain operating restrictions which tend to make them less than satisfactory for use as boost pumps. For example, the basic design of a centrifugal or impeller pump generally cannot produce sufficient vacuum at its inlet to achieve self-priming operation. As a result, when a large vapor bubble enters the inlet of a conventional centrifugal type boost pump, an interruption of the inlet fuel supply occurs, often resulting in a complete loss of the "prime" condition of the boost pump. As a result, the boost pump is incapable of displacing fuel through the supply conduit thereby terminating the supply of fuel to the engine, thus resulting in engine flame-out. Moreover, quick and effective re-priming of conventional centrifugal boost pumps used in aircraft fuel systems is practically impossible. Consequently, this type of extended flame-out occurrence results in extreme danger to the pilot and aircraft.

To help avoid the risk and consequences of such a fuel shutdown, modified forms of centrifugal pumps have been developed that provide both satisfactory self-priming capability and relatively constant output pressure capability. Such pumps are known generally as side-channel pumps. They are characterized by the ability to cause the liquid fuel to re-absorb undissolved fuel vapor to process large quantities of such vapor. As a result, side-channel pumps automatically reprime the system following a flame-out and rapidly restore the supply of liquid fuel so as to permit restoration of normal engine operation. It should be understood that the delivery of large amounts of undissolved vapor to the side-channel pump still may cause temporary periods of flame-out if the amount of vapor exceeds the pump capability. These side-channel pumps do not decrease the amount of undissolved vapor delivered to the engine and, therefore, do not prevent or even minimize the occurrence of flame-out.

SUMMARY OF THE INVENTION

Accordingly, it is one object of the present invention to provide an improved fuel pumping system which overcomes the disadvantages of the prior art by substantially minimizing the occurrence of flame-out or power degradation in a combustion engine.

Another object of the present invention is to provide an improved fuel system for use in aircraft that substantially avoids the sudden release of accumulated free vapor into the combustion chamber of an engine.

It is a further object of the present invention to provide an improved aircraft fuel system capable of providing a reserve supply of fuel to the engine upon an interruption of fuel delivery from the boost pump.

Yet another object of the present invention is to provide an improved aircraft fuel system that accumulates free vapor and returns it to its dissolved state in the liquid fuel before the fuel is discharged into the engine.

Still another object of the present invention is to provide an improved aircraft fuel system capable of preventing the loss of "prime" in boost pumps due to vapor bubbles.

Yet a further object of the present invention is to provide an improved aircraft fuel system for minimizing the "down-time" of the aircraft once flame-out occurs.

Still a further object of the present invention is to provide an improved aircraft fuel system capable of quickly and effectively re-priming upon pumping a large amount of vapor so as to return the system to normal operation while ensuring a continuous supply of fuel to the engine.

Yet another object of the present invention is to provide an improved aircraft fuel pumping system having an accumulator in the main fuel conduit that acts as a constant vapor collection vessel substantially independent of the aircraft "attitude".

These and other objects of the present invention are achieved by providing a fuel boost pumping system for delivering fuel from the aircraft tank to the engine main fuel pump and control system. The fuel boost pumping system includes a side-channel fuel boost pump, positioned along the fuel transfer circuit from aircraft tank to engine and an accumulator positioned along the fuel transfer circuit between the discharge outlet of the boost pump and the engine. The accumulator collects fluid fuel and vapor during routine engine operation so as to provide a reserve supply of fluid fuel to the engine, while continuing to store vapor, when the fuel supply to the boost pump has been interrupted. The invention also includes a vapor return loop circuit having an inlet located at or near the highest point of the accumulator container and an outlet located at or near the inlet to the side-channel boost pump. The vapor return loop includes a restriction orifice to limit the amount of flow through the loop and a check valve that functions to close the return loop in the event of an interruption of fuel flow to the boost pump; when the return loop is closed, the full suction effect of the boost pump is applied to the fuel inlet line of the boost pump, so as to reprime the pump from the aircraft tank. This occurs when the check valve closes in response to a loss in pressure at the discharge port of the side channel boost pump, and prevents flow of both liquid and vapor through the vapor return loop to the inlet side of the boost pump. The inlet to the boost pump is then limited solely to the fuel inlet circuit from the aircraft fuel tank. The accumulator device includes a vertically upward storage portion for accumulating vapor and a lower fuel storage portion for accumulating liquid fuel which may be consumed by the engine during periods when fuel flow to the inlet of the boost pump in interrupted. The accumulator also includes: an inlet for directing fuel and vapor from the outlet of the boost pump into the accumulator; a first outlet for discharging liquid fuel from the accumulator to the engine, and a second outlet for allowing fuel and vapor to flow through the vapor return loop. The first and second outlets from the accumulator are spaced apart in what is normally the vertical direction, so that the first outlet is normally submerged beneath the level of accumulated fluid fuel, and the second outlet is elevated above the fluid surface where it is accessible to fuel vapor only. As a result of this construction, undissolved vapor collected in the accumulator device during normal operation of the engine, is returned to the boost pump inlet to be redissolved in the pumped fuel and/or otherwise consumed during engine operation, substantially independently of the aircraft's flight position.

BRIEF DESCRIPTION OF THE DRAWINGS

FIG. 1 is a schematic diagram of the flame-out resistant fuel pumping system of the present invention;

FIG. 2 is a partial schematic of a fuel flow conduit for the system of FIG. 1 showing a repositioned right-angle bend containing a vapor bubble; and FIG. 3 is a partial schematic of the fuel flow conduit of FIG. 2 repositioned by, for example, shifting of an aircraft's attitude so as to release the vapor bubble.

DETAILED DESCRIPTION OF THE PREFERRED EMBODIMENT

Referring to FIG. 1, a fuel pumping system in accordance with the present invention, indicated generally at 10, relies upon a fuel supply tank 12 for supplying fuel to be delivered to an engine (not shown), and includes a fuel transfer circuit 14 providing a fuel flow path between supply tank 12 and the engine, a fuel boost pump 16 positioned along fuel transfer circuit 14 for pumping fuel from supply tank 12 through transfer circuit 14, a main fuel pump 18 positioned downstream of boost pump 16 for pumping fuel at an elevated pressure to the engine, and an accumulator vessel 20 between the boost pump 16 and main pump 18 for accumulating limited quantities of liquid fuel and vapor so as to provide a reserve supply of fuel while preventing undissolved vapor from being delivered to the engine. The term "vapor", as used herein, refers collectively to all gaseous components such as air and fuel vapor, that may be associated with liquid fuel in a fuel system, in any manner. Such vapor may be associated with the liquid as undissolved vapor confined within the system together with the liquid, or the vapor may be dissolved in the liquid fuel until it is released. Alternatively, such vapor may be derived from the liquid fuel itself such as by evaporation.

Fuel boost pump 16 includes a pump inlet 22 connected to supply tank 12 via transfer circuit 14 and a pump discharge outlet 24 connected to transfer circuit 14 downstream of booster pump 16. Fuel transfer circuit 14 may include a series of conduits or piping, formed of a material, such as steel, suitable for pumping liquid fuel, connected between each of the components of the pumping system 10 for directing fuel through the system. Pump 10 and accumulator 20 may be directly coupled in a housing having internal passages defining the fuel transfer circuit. Fuel boost pump 16 is capable of independently drawing fuel from supply tank 12 vertically upwardly, as generally shown in FIG. 1, through a distance of at least several feet, both at the beginning and throughout operation. This capability is known as "self-priming". In addition, boost pump 16 is capable of displacing or pumping both liquid and air or other gaseous components such as fuel vapor in various combinations, without risk of losing its "prime" condition (ability to continually draw fuel from supply tank 12). Since conventional impeller type centrifugal pumps usually cannot produce sufficient vacuum at the pump inlet to achieve self-priming operation and further are incapable of maintaining a prime condition when called upon to process large quantities of vapor, fuel boost pump 16 is preferably a modified form of centrifugal pump generally known as a side-channel pump, such as model EMC-91 boost stage pump manufactured by Chandler Evans Division of Coltec Industries Inc, the assignee of the present invention. Such pumps are characterized by a particular capability displace both liquid and gases such as fuel vapor in various combinations, with reduced risk of losing its prime, even when called upon to process large quantities of vapor.

Main fuel pump 18 receives fuel flowing through transfer circuit 14 from discharge outlet 24 of boost pump 16 and raises the pressure of the fuel for delivery to the engine. Preferably, main fuel pump 18 is a positive displacement pump which raises the pressure of the fuel to an optimum level necessary for effective delivery to, and combustion in, the engine.

Accumulator vessel 20 is positioned between booster pump 16 and main fuel pump 18 along fuel transfer circuit 14 and includes an accumulator inlet 26 and accumulator outlet 28. Accumulator vessel 20 forms a chamber 30 for receiving fuel from boost pump 16 via accumulator inlet 26. Chamber 30 includes a fuel storage portion 32 and a vapor storage portion 34. Fuel storage portion 32 is generally formed by the middle and lower portions of vessel 20 for accumulating fuel from boost pump 16. Preferably, accumulator outlet 28 is formed in the lower portion of vessel 20 adjacent fuel storage portion 32 so that fuel accumulating in fuel storage portion 32 is positioned above outlet 28. In this manner, fuel accumulated in fuel storage portion 32, as represented at 36, may be fed by gravity into outlet 28 in the absence of fuel flowing into inlet 26. Consequently, main fuel pump 18 will be supplied with fuel from accumulator vessel 20 even when boost pump 16 fails to deliver fuel to pump discharge outlet 24.

Vapor storage portion 34 is formed by the upper portion of accumulator vessel 20 so as to receive undissolved vapor flowing through fuel transfer circuit 14 from boost pump 16. Any vapor flowing into accumulator inlet 26 will rise upwardly through the denser liquid fuel 36 in fuel storage portion 32 into vapor storage portion 34. As a result, vapor is prevented from flowing into accumulator outlet 28 under most operating conditions. It should be noted that accumulator vessel 20 may be formed in various shapes and sizes so long as a portion of accumulator vessel 20 extends vertically above accumulator outlet 28 so as to form fuel storage portion 32 and vapor storage portion 34.

Accumulator vessel 20 also includes a second accumulator outlet 38 connected to vapor storage portion 34 and, preferably, to the top portion of accumulator vessel 20. A return passage or conduit 40 includes an inlet end 42 connected to second accumulator outlet 38. Return passage 40 also includes an outlet end 44 connected to fuel transfer circuit 14 upstream of boost pump 16. In this manner, return passage 40 directs fuel and/or vapor from accumulator vessel 20 back into transfer circuit 14 and pump inlet 22. Return passage 40 functions to return undissolved vapor accumulating in accumulator vessel 20 to the fuel supply side of boost pump 16 during normal engine operation so that it may be dissolved into the fuel and passed on for burning in the engine.

A check valve 46 is positioned in return passage 40 to prevent the flow of vapor and/or fuel from pump inlet 22 into vapor storage portion 34 of vessel 20. More importantly, check valve 46 controls the flow of vapor and/or fuel from vapor storage portion 34 depending on the operating conditions of the pumping system. Preferably check valve 46 is spring biased by a spring 48 into a closed position blocking flow of vapor and/or fuel from vessel 20. However, under normal operating conditions with boost pump 16 supplying fuel or combinations of fuel and vapor to the accumulator vessel 20, check valve 46 is forced into the open position by the pressure of fuel and/or vapor in accumulator vessel 20 so as to allow the fuel and/or vapor to recirculate back into the transfer circuit 14 upstream of boost pump 16. The bias force of check valve 46 is set at a pressure significantly below the usual operating discharge pressure of boost pump 16 so that the check valve remains open under normal operating conditions. However, under other operating conditions as explained more fully hereinbelow in regard to the operations of the fuel pumping system, check valve 46 may close to trap vapor in vessel 20 while preventing fuel from bypassing boost pump 16 by flowing from transfer circuit 14 back through return passage 40 into accumulator vessel 20. A restriction orifice 49 may be positioned in return passage 40 between accumulator vessel 20 and check valve 46 for limiting the flow of fuel and/or vapor through return passage 40 to a maximum predetermined flow rate.

The present fuel pumping system 10 is especially advantageous in preventing or at least minimizing engine "flame-out" during which combustion in the engine is inadvertently and undesirably terminated. Engine flame-out often occurs when fuel delivery to the engine is interrupted because the discharge pressure of the boost pump has dropped to a level which adequate fuel supply to the main pump inlet is not maintained. The resulting reduction in output flow from the main pump can result in a delivered fuel rate at the engine that is not sufficient to support engine combustion. The present fuel pumping system minimizes the occurrence of flameout by providing accumulator vessel 20. Any undissolved vapor, such as a vapor bubble 50, which is pumped through boost pump 16 into accumulator inlet 26 will necessarily enter vessel 20 and migrate vertically upward into vapor storage portion 34 while the incoming fuel accumulates in fuel storage portion 32. Since the accumulator outlet is connected to the lower portion of fuel storage portion 32, the undissolved vapor is prevented from flowing to the main fuel pump 18 and on to the engine. Moreover, in the event vapor bubble 50 is large enough to cause an interruption in fuel delivery from boost pump 16, fuel storage portion 32 continues to supply fuel, free from undissolved vapor, to main fuel pump 18 and the engine, while boost pump 16, operating in effect as a compressor, passes the pressurized vapor into the accumulator where it may act on the fluid fuel. This design not only avoids engine flame-out in many situations but also minimizes the destructive effects of cavitation on the pumping surfaces of main fuel pump 18 caused by the highly turbulent interaction of liquid and vapor. Moreover, as explained more fully hereinbelow in regard to the operation of the system, if vapor does reach the engine, thereby causing engine flame-out, the present system functions to effectively and quickly reprime and return the system to normal operation.

Under normal operating conditions, side-channel fuel boost pump 16 draws fuel from fuel supply tank 12 upwardly through transfer circuit 14 as shown in FIG. 1. Both fuel and vapor entering pump inlet 22 are expelled through pump discharge outlet 24 through transfer circuit 14 and accumulator inlet 26 into accumulator vessel 20. Fuel entering vessel 20 accumulates in fuel storage portion 32 while less dense, undissolved vapor floats upwardly into vapor storage portion 34. Meanwhile, main fuel pump 18 draws fuel from fuel storage portion 32 via accumulator outlet 28 and transfer circuit 14. Under normal operation, accumulated vapor in vapor storage portion 34 is expelled into return passage 40 via second accumulator outlet 38. The vapor passes through restriction orifice 49 and check valve 46 for return via outlet end 44 into boost pump inlet 22. Restriction orifice 49 meters the rate at which vapor passes through the return loop 40 so that the relatively low rate of flow encourages redissolving of the vapor into the liquid fuel. If little or no vapor accumulates in vapor storage portion 34, excess fuel will be recirculated via second accumulator outlet 38 and return passage 40 back into the low pressure region of fuel transfer circuit 14 upstream of inlet 22 to boost pump 16. The quantity of fuel flowing through passage 40 will be controlled by restriction 49 in a manner similar to the control of vapor flow, referred to above. As mentioned hereinabove, check valve 46 remains open under normal operating conditions since it is set at a pressure significantly below the operating discharge pressure of boost pump 16.

In the event of the ingestion of a large quantity of vapor, i.e., vapor bubble 50, into pump inlet 22 of boost pump 16, the vapor of fuel/vapor mixture will be pressurized by the boost pump 16 and discharged via pump discharge outlet 24. However, the vapor or mixture will be pressurized to a significantly lower value than experienced in normal operation. Accordingly, as the vapor is pumped into accumulator vessel 20, the pressure within vessel 20 begins to decrease. The vapor entering vessel 20 displaces the fuel in fuel storage portion 32 which continues to feed main fuel pump 18 and the engine. When the boost pump discharge pressure decreases to a predetermined level, check valve 46 will close, thereby trapping the vapor in accumulator vessel 20. Assuming that the duration of the vapor delivery event is short enough to preclude total consumption of the accumulated fuel in vessel 20, the boost pump will work to transfer the vapor bubble 50 to the accumulator vessel 20 quickly, and in such a way that engine performance is not affected, as described hereinbelow. Boost pump 16 functions as a compressor while it processes vapor bubble 50; if generates sufficient pressure to force the fuel in storage portion 32 into the main fuel pump 18 such that engine performance degradation is avoided. That is, main fuel pump 18 is sufficiently charged with fuel to preclude the adverse effects of fuel flow reduction to the engine.

Further, while boost pump 16 is acting as a compressor, it is hydraulically "decoupled" from the main fuel pump 18. During this time, the flow rate of boost pump 16 is not controlled by the main fuel pump; rather, the back pressure of accumulator vessel 20 determines the flow rate through boost pump 16. The relatively low back pressure of accumulator vessel 20 allows boost pump 16 to flow vapor at a faster rate than main fuel pump 18 flows fuel. Consequently vapor bubble 50 is transferred quickly to accumulator vessel 20, allowing boost pump 16 to return to normal fuel flow with minimum delay.

The volume of accumulator vessel 20 can be minimized as a result of the two features described above: namely, the quick transfer of vapor bubble 50, and the pressure rise of boost pump 16 while pumping air. The quick transfer of vapor bubble 50 brings fuel back to the system quickly thereby reducing dependency on storage portion 32. Hence, the volume requirement of storage portion 32 is minimized. The compression of vapor bubble 50 reduces the volume of vapor bubble 50 thereby minimizing the size requirement of vapor storage portion 34.

Once boost pump 16 begins to pump fuel again, the pressure in accumulator vessel 20 will rise back to normal constant levels as fuel is pumped into the accumulator vessel 20. Upon an increase in accumulator vessel pressure above a predetermined value, the check valve 46 will reopen to allow the stored vapor to recirculate through return passage 40 at a controlled rate dictated by restriction orifice 49. The recirculated vapor enters the fuel transfer circuit 14 in the low pressure region upstream of boost pump 16, at pump inlet 22, where it is permitted to dissolve in the supply fuel. As a result, the vapor can be pumped in a dissolved state through boost pump 16, fuel transfer circuit 14, accumulator vessel 20, and main fuel pump 18 for ultimate consumption in the engine.

In the event that a large enough volume of vapor is pumped by boost pump 16 into accumulator vessel 20 such that the duration of the vapor delivery event exceeds the amount of time needed to exhaust the fuel accumulated in fuel storage portion 32, an interruption in fuel supplied to main fuel pump 18, and consequently to the engine, would most likely occur thus resulting in an engine flame-out. However, during this time, boost pump 16 continues to displace vapor through transfer circuit 14 while maintaining the capability of drawing fuel from fuel supply tank 12. Moreover, check valve 46 will remain closed blocking flow of vapor back through return passage 40 into pump inlet 22, so that boost pump 16 may more effectively reprime the system. Once boost pump 16 begins pumping fuel again and such fuel is delivered to the engine, the engine may be relit so as to return the entire system to normal operation. Thus, the present fuel pumping system is uniquely capable of being advantageously resistant to engine flame-out while also capable of rapidly repriming and returning the system to normal operation upon a flame-out condition.

The present fuel pumping system is particularly advantageous when used in conjunction with aircraft and associated engines. The fuel systems of aircraft are subject to various temperature and pressure changes as the aircraft changes altitude. As a result, dissolved vapor in the fuel becomes undissolved free vapor within the confines of the system when, for example, the aircraft rises in altitude causing the ambient pressure to decrease substantially. The present invention avoids the deleterious effects of undissolved vapor in the fuel lines, such as engine flame-out and destructive cavitation, by substantially minimizing the amount of undissolved vapor delivered to the engine while minimizing the downtime of the engine in the event of engine flame-out. In addition, most conventional aircraft fuel systems are especially susceptible to engine flame-out due to accumulated undissolved vapor in the fuel lines because of the design of the fuel flow conduits and the changing flight attitude of the aircraft. For example, in many helicopters, it is common for the fuel tank to be located perhaps six or more feet below the engine and the boost pump, and perhaps an equal number of feet away from the engine in the horizontal direction. As a result, as shown in FIG. 1, fuel transfer circuit or conduit 14 usually includes various bends and curved portions, such as right-angle bends and elbows, for example, as indicated by elbow 52 in FIG. 1. It has been found that substantial quantities of undissolved free vapor can accumulate easily and unintentionally in these curved portions, especially as a result of changes in the flight attitude of aircraft. For example, with regard to a combat helicopter, bend 52 may be repositioned into the position shown in FIG. 2 as the aircraft changes its flight position. In the position shown in FIG. 2, bend 52 forms an inverted "V" having a volume at its vertex which disadvantageously acts to trap vapor in the conduit in the form of a vapor bubble 54. As vapor accumulates in the repositioned bend element 52, vapor bubble 54 may become very large in volume, occupying a substantial portion of fuel transfer conduit 14, for example, a portion even three to four feet in length. As the aircraft's flight attitude changes, elbow 52 may be repositioned into the orientation shown in FIG. 3 thus allowing vapor bubble 54 to be released and carried along the conduit to the boost pump or engine, depending upon the position of the coupling within the transfer circuit. In a conventional system, if elbow 52 was positioned upstream of the boost pump, a conventional boost pump would probably lose its prime condition resulting in an interruption in fuel to the engine and engine flame-out. If such a coupling exists between the boost pump and the main fuel pump without the accumulation function of the present invention, engine flame-out would also occur when the vapor bubble reaches the engine. However, the fuel pumping system 10 of the present invention including accumulator vessel 20 as shown in FIG. 1, substantially prevents vapor bubble 50, 54 from reaching the engine. Moreover, even if vapor bubble 50, 54 is of a sufficient volume to eventually cause engine flame-out due to the exhaustion of fuel from fuel storage portion 32, fuel pumping system 10 ensures that the pumping system would be reprimed and returned to normal operation quickly and effectively.

Industrial Applicability

The flame-out resistant fuel pumping system of the present invention may be used in a variety of vehicles to supply fuel to various engines, including gas turbines. The present fuel pumping system is especially advantageous when used in vehicles, such as aircraft, having fuel flow conduits vulnerable to vapor accumulation and/or wherein significant costs are associated with an engine flame-out.

We claim:

1. A fuel pumping system for delivering fuel to an engine, comprising:

a fuel supply tank for supplying fuel to be delivered to the engine;

a fuel transfer circuit for directing fuel from said fuel supply tank to the engine;

a fuel boost pump positioned along said fuel transfer circuit between said fuel supply tank and the engine for displacing fuel through said fuel transfer circuit from said fuel supply tank toward the engine, said fuel boost pump including a pump inlet and a pump discharge outlet;

an accumulator means positioned along said fuel transfer circuit between said pump discharge outlet and the engine for accumulating vapor and fuel so as to provide a reserve supply of fuel to the engine while minimizing the amount of undissolved vapor delivered to the engine; and a return conduit having an inlet end communicating with said accumulator means and an outlet end communicating with said fuel transfer circuit between said fuel supply tank and said accumulator means, said return conduit operating to direct vapor or vapor and fuel from said accumulator means into said fuel transfer circuit.

2. The fuel boost pumping system as defined in claim 1, wherein said fuel boost pump is a self-priming, centrifugal-type pump capable of pumping liquid and vapor.

3. The fuel boost pumping system as defined in claim 2, further including a main fuel pump positioned along said fuel transfer circuit between said accumulator means and the engine for delivering fuel at an elevated pressure to the engine.

4. The fuel boost pumping system as defined in claim 3, wherein said accumulator means includes an accumulator inlet for directing fuel and vapor into said accumulator means through said return conduit from said pump discharge outlet, a first accumulator outlet for discharging fuel from said accumulator means through said fuel transfer circuit to the engine, and a second accumulator outlet for allowing fuel and vapor to exit from said accumulator means.

5. A fuel pumping system for delivering fuel to an engine comprising:

a fuel supply tank for supplying fuel to be delivered to the engine;

a fuel transfer circuit for directing fuel from said fuel supply tank to the engine;

a fuel boost pump positioned along said fuel transfer circuit between said fuel supply tank and the engine for displacing fuel through said fuel transfer circuit from said fuel supply tank toward the engine, said fuel boost pump being a self-priming, centrifugal-type pump capable of pumping liquid and vapor and including it pump inlet and a pump discharge outlet;

an accumulator means positioned along said fuel transfer circuit between said pump discharge outlet and the engine for accumulating vapor and fuel so as to provide a reserve supply of fuel to the engine while minimizing the amount of undissolved vapor delivered to the engine, said accumulator means including an accumulator inlet for directing fuel and vapor into said accumulator means from said pump discharge outlet, a first accumulator outlet for discharging fuel from said accumulator means through said fuel transfer circuit to the engine, and a second accumulator outlet for allowing fuel and vapor to exit from said accumulator means; and a return passage having an inlet end communicating with said second accumulator outlet and an outlet end communicating with said fuel transfer circuit upstream of said pump discharge outlet for directing fuel and vapor from said accumulator means into said fuel transfer circuit.

6. The fuel boost pumping system of claim 5, wherein said outlet end of said return passage communicates with said pump inlet, and further including a flow limiting means positioned along said return passage for limiting the flow rate of fuel and vapor flowing through said return passage.

7. The fuel boost pumping system of claim 6, further including a valve means positioned along said return passage for preventing fluid flow from said outlet end through said return passage to said accumulator means, said valve means operable to permit fluid flow from said accumulator means through said return passage into said fuel transfer circuit.

8. The fuel boost pumping system of claim 7, wherein fluid flows into said pump inlet at a first fluid pressure and fluid flows from said pump discharge outlet at a second fluid pressure, said valve means preventing fluid flow from said accumulator means through said return passage when the difference between said second fluid pressure and said first fluid pressure is less than a predetermined value.

9. The fuel boost pumping system of claim 7, wherein said flow limiting means is positioned along said return passage between said valve means and said accumulator means.

10. The fuel boost pumping system as defined in claim 6, wherein a portion of said return passage adjacent said flow limiting means has a given cross-sectional flow area, said flow limiting means including a restriction orifice having a cross-sectional flow area less than said given cross-sectional flow area of said portion of said return passage.

11. The fuel boost pumping system as defined in claim 8, wherein said valve means includes a spring-biased check valve.

12. A fuel pumping system for pumping fuel from a fuel-supply tank to an aircraft engine while preventing flame-out of the aircraft engine due to accumulated vapor, comprising:

a fuel flow conduit for directing fuel from said fuel supply tank to the aircraft engine;

a fuel boost pump positioned along said fuel flow conduit for displacing fuel from said supply tank through said fuel flow circuit toward the aircraft engine;

an accumulator container positioned along said fuel flow conduit between said boost pump and the aircraft engine, said accumulator container including an upper vapor storage portion for accumulating vapor, a fuel storage portion below said vapor storage portion for accumulating liquid fuel during normal operation of the fuel pumping system, an accumulator inlet passage for directing liquid fuel and vapor from said boost pump into said accumulator container, a first accumulator outlet passage connected to said first storage portion for directing liquid fuel into said fuel flow conduit toward the aircraft engine, and a second accumulator outlet passage connected to said vapor storage portion for discharging fuel and vapor from said accumulator container; and a return passage having an inlet end connected to said second accumulator outlet passage and an outlet end communicating with said fuel flow conduit between said fuel supply tank and said accumulator inlet passage, said return passage operating to direct vapor and fuel from said accumulator container into said fuel flow conduit.

13. The fuel pumping system as defined in claim 12, wherein said boost pump is a self-priming, centrifugal-type pump capable of pumping liquid and vapor.

14. The fuel pumping system as defined in claim 13, further including a main fuel pump positioned along said fuel flow conduit between said accumulating container and the engine for delivering fuel at an elevated pressure to the aircraft engine.

15. The fuel pumping system of claim 14, wherein the outlet end of said return passage communicates with said fuel flow conduit upstream of said boost pump for directing fuel and vapor from said accumulator container into said fuel flow conduit.

16. The fuel pumping system of claim 15, further including a flow limiting means positioned along said return passage for limiting the flow rate of fuel and vapor flowing through said return passage.

17. The fuel pumping system of claim 16, further including a valve means positioned along said return passage for preventing fluid flow from said outlet end through said return passage to said accumulator container, said valve means operable to permit fluid flow from said accumulator container through said return passage into said fuel flow conduit.

18. The fuel pumping system of claim 17, wherein said boost pump includes a pump inlet and a pump discharge outlet, and wherein fluid flows into said pump inlet at a first fluid pressure and fluid flows from said pump discharge outlet at a second fluid pressure, said valve means preventing fluid flow from said accumulator container through said return passage when the difference between said second fluid pressure and said first fluid pressure is less than a predetermined value.

19. The fuel pumping system of claim 17, wherein said flow limiting means is positioned along said return passage between said valve means and said accumulator container.

20. The fuel pumping system as defined in claim 16, wherein a portion of said return passage adjacent said flow limiting means has a cross-sectional flow area, said flow limiting means including a restriction orifice having a cross-sectional flow area less than said cross-sectional flow area of said portion of said return passage.

* * * * *